US012035451B2

(12) United States Patent
Flachenecker et al.

(10) Patent No.: US 12,035,451 B2
(45) Date of Patent: Jul. 9, 2024

(54) METHOD AND SYSTEM FOR LIQUID COOLING ISOLATED X-RAY TRANSMISSION TARGET

(71) Applicant: Carl Zeiss X-ray Microscopy, Inc., Dublin, CA (US)

(72) Inventors: Claus Flachenecker, Hayward, CA (US); Bruce Borchers, Scott's Valley, CA (US); Thomas A. Case, Walnut Creek, CA (US)

(73) Assignee: CARL ZEISS X-RAY MICROSCOPY INC., Dublin, CA (US)

( * ) Notice: Subject to any disclaimer, the term of this patent is extended or adjusted under 35 U.S.C. 154(b) by 167 days.

(21) Appl. No.: 17/238,799

(22) Filed: Apr. 23, 2021

(65) Prior Publication Data

US 2022/0346212 A1 Oct. 27, 2022

(51) Int. Cl.
*H05G 1/02* (2006.01)
*H01J 35/12* (2006.01)
*H01J 35/14* (2006.01)

(52) U.S. Cl.
CPC ............ *H05G 1/025* (2013.01); *H01J 35/13* (2019.05); *H01J 35/14* (2013.01); *H01J 2235/1204* (2013.01); *H01J 2235/1216* (2013.01); *H01J 2235/1262* (2013.01)

(58) Field of Classification Search
CPC .. H05G 1/025; H01J 35/13; H01J 2235/1262; H01J 35/14
See application file for complete search history.

(56) References Cited

U.S. PATENT DOCUMENTS 2,559,526 A * 7/1951 Van De Graaf ...... H01J 35/147 313/18
4,352,021 A 9/1982 Boyd et al.
6,212,256 B1 4/2001 Miesbauer et al.
6,885,728 B2 4/2005 Hadland et al.
9,524,845 B2 12/2016 Boye et al.
9,748,070 B1 8/2017 Wall
9,941,090 B2 4/2018 Hadland
10,701,788 B2 6/2020 Sakabe et al.
(Continued)

FOREIGN PATENT DOCUMENTS

CN 104 020 184 B 3/2017
DE 732 038 C 2/1943
(Continued)

OTHER PUBLICATIONS

European Partial Search Report, completed on Sep. 9, 2022, from European Application No. EP 22 16 9597.6, filed on Apr. 22, 2022. 15 pages.
(Continued)

*Primary Examiner* — Chih-Cheng Kao
(74) *Attorney, Agent, or Firm* — HoustonHogle LLP

(57) ABSTRACT

An x-ray source has a target assembly including a target, an electron source for generating electrons to impact the target, and a flight tube assembly separating the target assembly from the electron source and transporting a coolant to the target assembly. The flight tube assembly includes a flight tube interface ring, a target cartridge tube, and an electrical isolation ring between the flight tube interface ring and the target cartridge tube.

24 Claims, 7 Drawing Sheets

(56) References Cited

U.S. PATENT DOCUMENTS

| | | | | |
|---|---|---|---|---|
| 10,923,307 | B1 * | 2/2021 | Yabushita | H01J 35/045 |
| 2002/0085676 | A1 | 7/2002 | Snyder | |
| 2002/0181654 | A1 | 12/2002 | Baertsch et al. | |
| 2004/0076260 | A1 * | 4/2004 | Charles, Jr. | H01J 35/18 378/124 |
| 2004/0114712 | A1 | 6/2004 | Eppler et al. | |
| 2004/0190675 | A1 * | 9/2004 | Birdwell | H01J 35/24 378/19 |
| 2006/0171506 | A1 | 8/2006 | Lovoi et al. | |
| 2007/0053495 | A1 | 3/2007 | Morton et al. | |
| 2008/0123815 | A1 | 5/2008 | Feda | |
| 2009/0086917 | A1 * | 4/2009 | Warburton | H01J 35/18 378/140 |
| 2010/0020937 | A1 * | 1/2010 | Hautmann | H01J 35/147 378/137 |
| 2012/0027164 | A1 * | 2/2012 | Caiafa | H05G 1/52 378/111 |
| 2012/0269326 | A1 * | 10/2012 | Adler | H05G 1/52 378/138 |
| 2014/0050305 | A1 | 2/2014 | Zhao et al. | |
| 2014/0140486 | A1 | 5/2014 | Yanagisawa et al. | |
| 2014/0161232 | A1 | 6/2014 | Jeong et al. | |
| 2014/0294150 | A1 | 10/2014 | Tamura et al. | |
| 2015/0117616 | A1 | 4/2015 | Ishii et al. | |
| 2016/0196950 | A1 | 7/2016 | Ishihara et al. | |
| 2016/0336140 | A1 | 11/2016 | Nonoguchi et al. | |
| 2017/0004950 | A1 * | 1/2017 | Nonoguchi | H01J 37/09 |
| 2017/0110283 | A1 * | 4/2017 | Shirota | H01J 35/30 |
| 2017/0318651 | A1 | 11/2017 | Canfield et al. | |
| 2017/0372865 | A1 | 12/2017 | Ishihara et al. | |
| 2018/0033582 | A1 | 2/2018 | Hadland | |
| 2018/0352638 | A1 | 12/2018 | Guo | |
| 2019/0069384 | A1 | 2/2019 | Ando | |
| 2020/0154552 | A1 | 5/2020 | Suzuki et al. | |

FOREIGN PATENT DOCUMENTS

| | | | | |
|---|---|---|---|---|
| EP | 2763156 | A1 | | 8/2014 |
| FR | 943992 | A | | 3/1949 |
| JP | H09117450 | A | | 5/1997 |
| JP | 2002042705 | A | * | 2/2002 |
| JP | 2010 027446 | A | | 2/2010 |
| JP | 2010244834 | A | | 10/2010 |
| JP | 2014229596 | A | | 12/2014 |
| JP | 5945337 | B2 | | 7/2016 |
| KR | 2020 0129300 | A | | 11/2020 |
| WO | WO 2018/066135 | A1 | | 4/2018 |
| WO | WO 2020177775 | A2 | | 9/2020 |

OTHER PUBLICATIONS

European Partial Search Report, completed on Sep. 29, 2022, from European Application No. EP 22 16 9521.9, filed on Apr. 22, 2022. 72 pages.

European Partial Search Report, completed on Oct. 4, 2022, from European Application No. EP 22 16 9599.2, filed on Apr. 22, 2022. 29 pages.

European Search Report, completed on Dec. 22, 2022, from European Application No. EP 22169521.6, filed on Apr. 22, 2022. 110 pages.

European Search Report, completed on Jan. 12, 2023, from European Application No. EP 22169597.6, filed on Apr. 22, 2022. 21 pages.

European Search Report, completed on Dec. 13, 2022, from European Application No. EP 22169599.2, filed on Apr. 22, 2022. 71 pages.

* cited by examiner

METHOD AND SYSTEM FOR LIQUID COOLING ISOLATED X-RAY TRANSMISSION TARGET

RELATED APPLICATIONS

This Application is Related to:

U.S. application Ser. No. 17/238,785 filed Apr. 23, 2021, entitled "X-ray source with liquid cooled source coils," invented by Claus Flachenecker and Thomas A. Case, now U.S. Patent Publication No.: US 2022/0346211 A1; and U.S. application Ser. No. 17/238,811 filed Apr. 23, 2021, entitled "Fiber-optic communication for embedded electronics in x-ray generator," invented by Claus Flachenecker, now U.S. Patent Publication No.: US 2022/0346213 A1.

All of the afore-mentioned applications are incorporated herein by this reference in their entirety.

BACKGROUND OF THE INVENTION

X-rays are widely used in microscopy because of their short wavelengths and ability to penetrate objects. Typically, the best source of the x-rays is a synchrotron, but these are expensive systems. So, often so-called tube or laboratory x-ray sources are used in which a generated electron beam bombards a target. The resulting x-rays include characteristic line's) determined by the target's composition and broad bremsstrahlung radiation.

There are a few basic configurations for X-ray microscopy systems. Some employ, a condenser to concentrate the x-rays onto the object under study and/or an objective lens to image the x-rays after interaction with the object. The resolution and aberrations associated with these types of microscopes are usually determined by the spectral characteristics of the x-rays. Some microscopy systems employ a projection configuration in which a small x-ray source spot is used often in conjunction with geometric magnification to image the object.

Performance and particularly resolution are affected by different factors. Because the projection configuration does not have aberrations, the resolution is typically determined by the size of the x-ray source spot. Ideally, the x-ray source spot would be a point spot. In practice, the x-ray source spot is considerably larger. Generally, the source spot size is determined by the electron optics and the ability of those optics to focus the electron beam down to a point. Source spot sizes are generally around 50-200 micrometers (μm) with good electron optics; although in other examples x-ray-source spot size may be 1-5 millimeters (mm) when power is a more important figure of merit. For transmission-target x-ray sources, spot sizes of a few micrometers are common, such as 1 μm to 5 μm. In fact, some transmissions sources have spot sizes down to 150 nanometers (nm). In any event, x-ray-source sizes will generally limit the resolution of an x-ray projection microscope.

For many microscopy applications, a transmission-target x-ray source is often used. In the basic configuration of an X-ray tube, thermionic or field emission electrons are generated at a cathode (filament) in a vacuum tube and accelerated to an anode (forming an electron beam which is shaped by different electro static and (electro-) magnetic optical elements. For example, magnetic lenses often use coils of copper wire inside iron pole pieces. A current through the coils creates a magnetic field in the bore of the pole pieces. Electrostatic lenses employ a charged dielectric to create an electrostatic field. The electron beam then strikes the typically thin target at its backside, common target materials are for instance tungsten, copper, and chromium. Then x-rays emitted from the target's front side are used to irradiate the object.

SUMMARY OF THE INVENTION

During operation of a transmission (or reflection) target x-ray source, heat must be removed from the target. And, the heat is excessive, since only a very small percentage of the electron beam's energy is transformed into x-rays.

Removal of heat from the target itself is typically done by thermal conduction toward a water- or air-cooled sink of the target. For the transmission target itself, materials with low X-ray absorption (low-Z) are used, like Diamond or Beryllium, which are also good heat conductors. After moving the heat away from the x-ray burn spot, cheaper and more convenient materials are utilized for the thermal conduction toward the cooling member, like Copper.

Nevertheless, thermal conduction should be maximized, especially for high-performance x-ray sources. In general, shorter thermal paths to the sink are desirable. Moreover, conducting heat through other structural elements of the source (like a magnetic lens yoke) should be avoided as it leads to thermal drift of these components and thus X-ray spot-position drift or instabilities. Moreover, regulating the produced x-ray output also involves measurement of the target current, which requires electrical isolation of the (hot) target.

The present approach can include several innovations. First, the x-ray target can be bonded to a small, cylindrical, electrically-isolated and thermally conducting "cartridge". The "cartridge" includes two copper "cylinders," a flight tube interface ring and a target cartridge tube, which are bonded to each side of a thin, separating, diamond insulator ring. This allows for excellent thermal conduction while maintaining electrical isolation.

Further, the cartridge or target assembly is attached to special liquid-cooled flight tube assembly, which brings liquid coolant, such as water, very close to the cartridge. Examples of the flight tube assembly incorporate a triple-walled tube, with a diameter that is also similar to the diameter of the x-ray target. The inner wall acts as barrier between vacuum and cooling liquid; the outer wall acts as barrier between cooling liquid and ambient air, and middle wall or baffle acts as barrier between in-flowing and out-flowing cooling liquid. A manifold at the base of the flight tube assembly allows supply and return of the cooling liquid. Thus, the cooling liquid flows from the base of the flight tube assembly all the way to the distal end, where the target "cartridge" is bonded, minimizing the length of the thermal path between x-ray target and cooling liquid. Preferably, the diameter of the flight tube assembly and the target assembly are of similar dimensions as the x-ray target itself, and all are small enough to fit inside of the annular magnetic lens yoke. It thus decouples the x-ray target elements thermally and mechanically from the magnetic focus lens and other steering and shaping units. In addition, no part of the magnetic lens yoke or other steering units needs to be exposed to vacuum, and can be aligned independently.

In general, according to one aspect, the invention features an x-ray source. It comprises a target assembly including a target, an electron emitter for generating electrons to impact the target, and a flight tube assembly separating the target assembly from the electron source and transporting a coolant to the target assembly.

In a current embodiment, the target is a transmission target, but the principles could also be applied to a reflection target.

In embodiments, the source further comprises a flight tube manifold for supplying coolant to the flight tube assembly and receiving returning coolant.

In one example, the flight tube assembly comprises an inner flight tube, an outer flight tube, and a baffle between the inner flight tube and the outer flight tube for directing coolant to a distal end of the flight tube assembly.

In general, according to another aspect, the invention features a method for cooling a target of an x-ray source, comprising flowing coolant through a flight tube assembly to a target and flowing the coolant returning from the target through the flight tube assembly.

In general, according to another aspect, the invention features a target assembly for an x-ray source. This assembly comprises a target, a cartridge tube holding the target, an interface ring for interfacing to a flight tube, and an isolation ring between the cartridge tube and the interface ring.

In general, according to another aspect, the invention features an x-ray source comprising a target assembly including a target, an electron source for generating electrons to impact the target, a high voltage generator for accelerating the electrons, a flight tube assembly separating the target assembly from the electron source, a magnetic focus lens, and a beam steering and shaping system nested between the magnetic focus lens and the flight tube assembly.

The beam steering and shaping system can comprise at least one steering/shaping unit between the flight tube assembly and a yoke of the magnetic focus lens. The steering/shaping unit might comprise at least eight coils.

In general, according to another aspect, the invention features an x-ray source comprising a target assembly including a target, an electron source for generating an electron beam, a flight tube assembly separating the target assembly from the electron source, a magnetic focus lens for focusing the electron beam on the target, and a beam steering and shaping system having separately controlled coils for steering and shaping the electron beam.

In general, according to another aspect, the invention features a method for operating an x-ray source comprising generating an electron beam and guiding the beam to a target to generate x-rays and in a standby mode guiding the electron beam to miss the target to inhibit generation of x-rays at the target.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term “and/or” includes any and all combinations of one or more of the associated listed items. Also, all conjunctions used are to be understood in the most inclusive sense possible. Thus, the word “or” should be understood as having the definition of a logical “or” rather than that of a logical “exclusive or” unless the context clearly necessitates otherwise. Further, the singular forms and the articles “a”, “an” and “the” are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as “first” and “second” are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
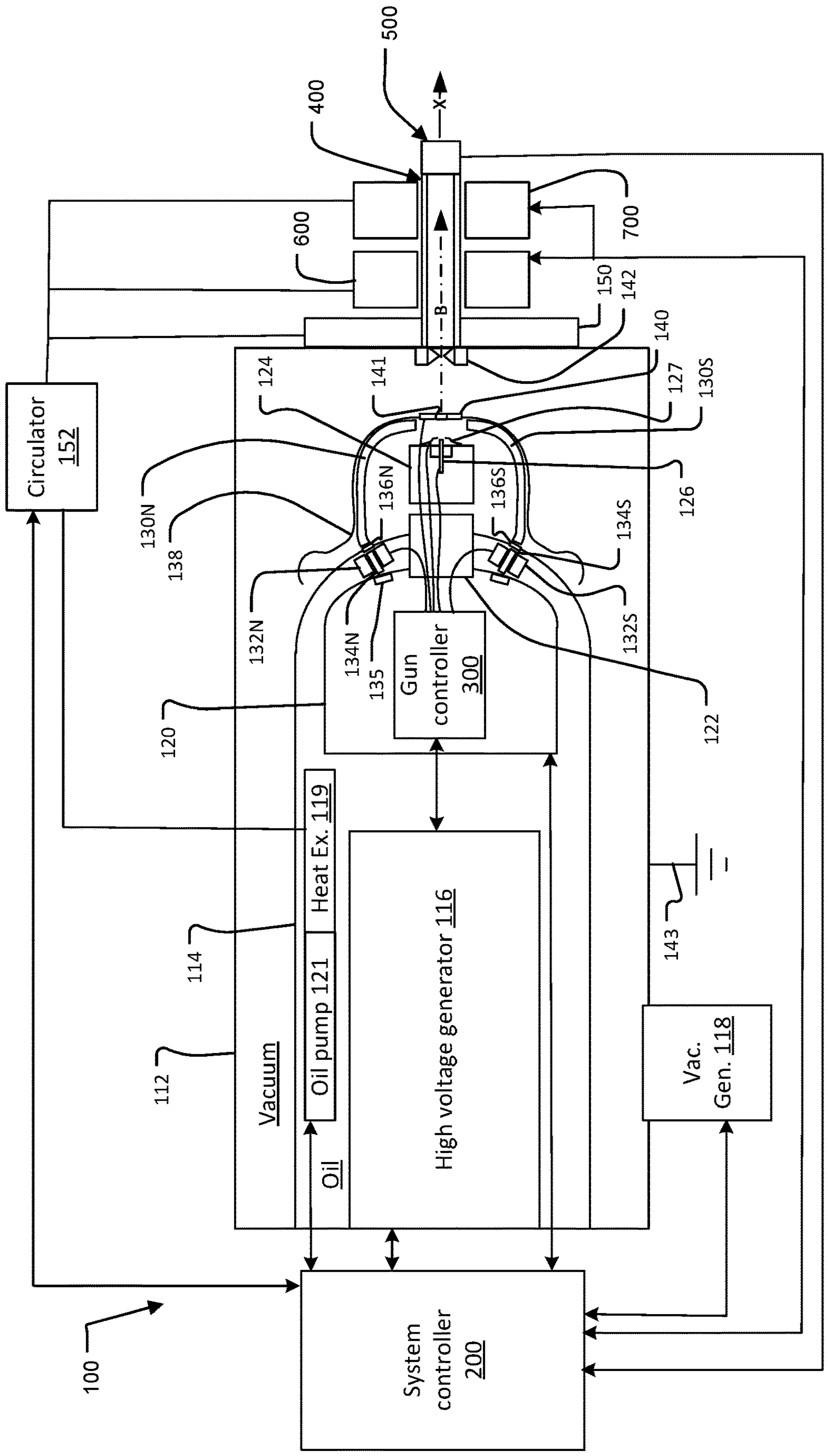
FIG. 1 is a schematic cross-sectional view of an x-ray source according to the present invention.

FIG. 1 is a schematic cross-sectional view of an x-ray source 100, which has been constructed to the principles of the present invention.

The illustrated embodiment is a "transmission-target" source. The electron beam B strikes a target of the target assembly 500 and the x-rays X, which are emitted from the opposite side of the target, are used for illuminating an object. That said, many aspects of the following innovations are equally applicable to other x-ray tube source configurations including side-window, rotating anode, and metal-jet anode.

In general, the x-ray source comprises a vacuum vessel 112 and an oil vessel 114 arranged within the vacuum vessel. Preferably, the vacuum vessel 112 is metal, such as aluminum or stainless steel, for strength against the vacuum. The oil vessel 114 is preferably constructed from a non-conductive material such as ceramic, e.g., sintered alumina, providing electrical insulation to prevent arcing to the high voltage components that it contains.

A vacuum generator 118 is used to draw and/or maintain a vacuum on the vacuum vessel 112. In one example, an ion pump is used.

Arranged inside the oil vessel is a heat exchanger 119. For this purpose, a plate heat exchanger can be used to remove thermal energy (heat) from the oil to coolant, such as water, that is circulated through the exchanger. Some embodiments further employ an oil submersible pump 121 to circulate oil within the oil vessel 114. In preferred embodiments, a circulator 152 is used to flow coolant through the heat exchanger 119 and to carry away heat from the oil.

Generally, the vacuum vessel 112 defines a volumetric evacuated region through which the electron beam B propagates from the electron emitter 126 (filament or cathode), typically located near the distal end of the oil vessel 114 to the target held by the target assembly 500. The evacuated region also preferably surrounds at least a portion of the oil vessel that contains the high voltage components to provide high-voltage insulation.

A system controller 200 is located outside both vessels 112, 114. This contains the main controller and the data interfaces to external devices. It also contains the power supply for connection to a main electricity supply. In addition, it controls the vacuum generator 118 and the circulator 152.

A high voltage generator 116 is located in the oil vessel 114. Its base is at the proximal side of the oil vessel 114, allowing it to receive power from the system controller 200. The high voltage generator 116 is immersed in the oil contained in the oil vessel 114 for thermal control and high-voltage insulation. The oil is mostly required to make the generator 116 relatively small. The generator 116 could also be potted, however. Moving distally, the high voltage generator 116 is further electrically isolated from the environment by the oil and the surrounding vacuum of the vacuum vessel 112.

The high voltage generator 116 in a current example generates a negative 20-160 kV acceleration voltage and provides power for the gun controller 300 that controls the electron source (emitter or filament) among other things. The high voltage generator biases the entire gun controller to this large negative voltage so that generated electrons will accelerate toward less negative voltages and ground.

An inner vessel 120 is located distally of the distal end of the high voltage generator 116. The inner vessel 120 is immersed in the oil of the oil vessel 114. In the current embodiment, the inner vessel is preferably constructed from a metal such as aluminum and soft iron. It is also filled with oil, which helps with transfer of heat from the electronics, as well as heat from the source coils, which will be explained later.

A gun controller 300 is housed within the inner vessel 120, which also functions as a Faraday cage to electrically protect the controller 300. It drives the electron emitter and provides control for electron emitter, beam generation, regulation and steering.

An electron emitter e.g., filament, 126 is held in a filament mount 124. In a current example, the electron emitter 126 includes a Lanthanum Hexaboride (LaB6) crystal and a carbon heater rod. It projects into the vacuum of the vacuum vessel to function as a thermionic source or electron emitter (cathode). Other configurations are possible, such as W, CeB6, HfC and carbon-nanotube filaments.

A vacuum feedthrough 122 provides electrical connections between the gun controller 300 in the inner vessel 120, through the oil contained in the oil vessel 114 and its outer wall.

A suppressor electrode or Wehnelt cap 127 is mounted to the distal side of the filament mount 124 and covers the filament 126. The electrons emitted from the filament 126 pass through a central aperture of the suppressor electrode 127. Its voltage is controlled by the gun controller 300.

A protective field cap 138 has a general bell shape, extending over the electron emitter 126 and its filament mount 124 and wrapping back to the distal end of the oil vessel 114. Its distal end carries a first or extractor anode 140. The voltage of the first anode and also the cap is controlled by the gun controller 300 to accelerate the emitted electrons into the beam B and through a center aperture 141 of the first anode 140. Thus, in operation, the electron beam passes through the center aperture 141 of the first anode 140.

The first anode is not necessary, however. The system could also be designed without this first anode and rely on other means to accelerate the electrons.

The beam B is directed through an aperture of a flight tube aperture assembly 142 in a distal wall of the vacuum vessel 112. This flight tube aperture assembly functions as a second anode and is currently held at a ground potential 143. Thus, with the gun controller being biased to a large negative voltage, the electrons are further accelerated in the gap between the first anode 140 and the flight tube assembly 142.

On the other hand, in other embodiments, the flight tube aperture assembly 142 is electrically isolated from the vacuum vessel 112 with an insulating gasket, such as diamond. And, a voltage generator is added to supply a controlled potential to the flight tube aperture assembly. In this configuration, the system controller 200 also controls the voltage of this second anode to provide further control of, such as further acceleration to, the electron beam B. A flight tube assembly 400 extends the vacuum to the target assembly 500 at its target. A flight tube manifold 150 provides liquid cooling to the target assembly through the flight tube assembly walls with coolant, such as water, from the circulator 152.

Along the flight tube assembly 400 is arranged a flight tube beam steering and shaping system 600 to condition the electron beam and guide the beam to an arbitrary position on the target. This is done by the flight tube assembly 400 and beam steering and shaping system 600 which directs the electron beam B through a magnetic focus lens 700 at a desirable angle and location. In general, the beam steering locates the spot on different positions on the target as the target is consumed during operation.

Further along the flight tube assembly 400 is arranged the magnetic focus lens 700 to focus the beam B on the target.

Preferably, both the flight tube beam steering and shaping system 600 and the magnetic focus lens 700 are cooled by coolant circulated from the circulator 152 and controlled by the system controller 200.

A set of source coils 132N, 132S, not shown (before and behind image plane): 132E, 132W and their respective cores 134N, 134S, not shown: 134E and 134W are integrated with the oil vessel 114, gun controller inner vessel 120 and protective field cap 138. The coils are located outside the vacuum of the vacuum vessel. In one example, they could be located on an outer wall of the vacuum vessel, exposed to the ambient atmosphere. In the illustrated example, source coils 132N, 132S, 132E, 132W are located in the oil vessel and thus efficiently cooled by the contained oil, although the coils could instead be potted.

More generally oil could be replaced with potting material or any other high voltage compatible cooling material, such as Fr-77 by Sigma Aldrich, Sf6-Novec 4710 by 3M, or C3F7CN.

In more detail, two source coils 132N, 132S are generally located above and below the filament 126. Two additional source coils 132E, 132W are located at the other two axes below and above, respectively, the plane of the drawing. A north pole piece 130N and a south pole piece 130S extend respectively from the cores 134N and 134S of the source coils 132N, 132S, wrapping around the inner side of the protective field cap 138 to converge above and below the center aperture 141 of the first anode 140, respectively. And, in a similar vein, an east pole piece 130E and a west pole piece 130W (at the other two axes below and above, respectively, the plane of the drawing) extend from the cores 134E and 134W of the source coils 132E, 132W, also wrapping around the inner lateral sides of the protective field cap 138 to converge to the left and right of the center port 141, respectively, thus forming a magnetic circuit surrounding the emitter in vacuum.

The pole pieces 130N, 130S, 130E and 130W could be mechanically connected to virtually anything in the emitter region. Thus, while they are carried by the protective field cap in the illustrated embodiment, they do not need to be directly connected. That said, in the current example, the pole pieces 130N, 130S, 130E and 130W are connected to the protective cap, which is electrically at the potential of the first anode 140.

An annular, ring-shaped yoke 135 is located on the proximal side of the cores 134N, 134S, 134E and 134W and is fabricated as part of the vessel 120 to improve the magnetic circuit. In fact, in a current embodiment, the distal end of the inner vessel 120 is soft iron and thus completes the magnetic circuit by guiding the magnetic flux between the cores.

In the preferred embodiment, the magnetic circuit for the source coils 132N, 132S, 132E, 132W is further improved with magnetizable or ferromagnetic wall plugs 136N, 136S, 136E, 136W. These wall plugs are inserted into holes formed in the oil vessel 114 that are opposite the distal ends of the respective cores 134N, 134S, 134E and 134W. This improves the magnetic flux through the circuit. Specifically, the plugs minimize the gap between the coil cores 134N, 134S, 134E and 134W and the respective pole pieces 130N, 130S, 130E and 130W.

Possibly, the plugs 136N, 136S, 136E, 136W are inserted into holes that were previously drilled into the ceramic oil vessel 114. The same alternatively can be done by welding nickel-cobalt ferrous alloy or soft iron plugs into a pre-drilled hole of the stainless steel vacuum chamber 112. Other combinations are possible as well.

In a current implementation, the source coils 132N, 132S, 132E, 132W are driven and operated in current-controlled mode by the gun controller 300. Feedback is obtained indirectly by measuring the amount of beam going through the "anode aperture" onto the target by the system controller 200 which provides this information to the gun controller. The source coils are controlled by the gun controller 300 steering the electron beam near its source and specifically steer the beam in the gap between the filament 126 and the first anode 140 to thus steer the beam as it is being initially accelerated.

Figure 2:
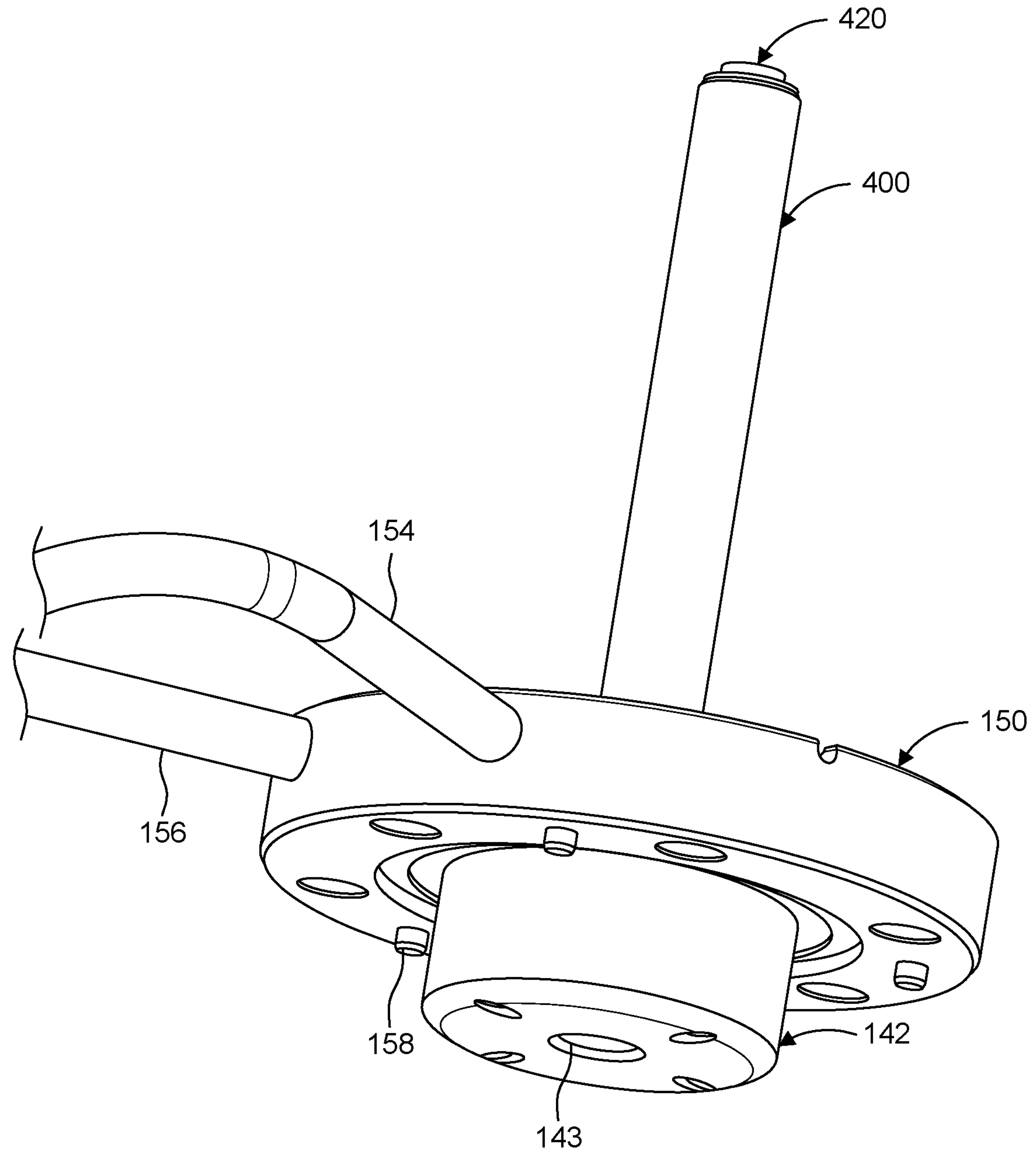
FIG. 2 is a scale perspective view showing the flight tube assembly 400, manifold 150, and flight tube aperture assembly 142.

FIG. 2 shows the flight tube assembly 400 and its interface to the manifold 150, and the flight tube aperture assembly 142.

The general diameters of the flight tube assembly 400 and the target assembly 500 are dimensioned in their diameters to fit inside of the yokes of the flight tube beam steering and shaping system 600 and magnetic focus lens 700. It thus decouples the x-ray target thermally and mechanically from the magnetic focus lens 700 and beam steering and shaping system 600.

In more detail, the flight tube aperture assembly 142 attaches to the proximal side of the disk-shaped flight tube manifold 150. These center aperture 143 of the flight tube aperture assembly 142 provides the port through which the electron beam enters the flight tube assembly 400. Being at a ground potential, the fight tube aperture assembly 142 also functions as a second anode to further accelerate the electron beam between the first anode 140 and the origin of the flight tube.

The proximal side of the manifold 150 secures to the distal side of the vacuum vessel via a set of alignment pins 158 and provides a vacuum seal. Coolant is supplied by the circulator 152 to the manifold 150 via a coolant supply tube 154 interfacing around an outer periphery of the manifold 150. Similarly, a coolant return tube 156 also interfaces along the manifold's outer periphery to loop the coolant back to the circulator 152 (FIG. 1). The flight tube assembly 400 projects axially from the manifold 150 with the flight tube assembly 400 being capped by the target assembly 500 (not shown).

With this construction of the flight tube assembly 400, there is a continuous tubular path from the flight tube aperture assembly 142 to the target assembly 500, extending through the beam steering and shaping system 600 and the magnetic focus lens 700. This connection is not interrupted by any components, such as O-rings, that could be damaged by high temperatures. Instead, the flight tube assembly 400 is a continuous metal assembly constructed from high temperature tolerant joints formed by welding, brazing and/or soldering. In addition, the manifold 150 is attached using a copper gasket, which can also be baked to high temperatures.

Figure 3:
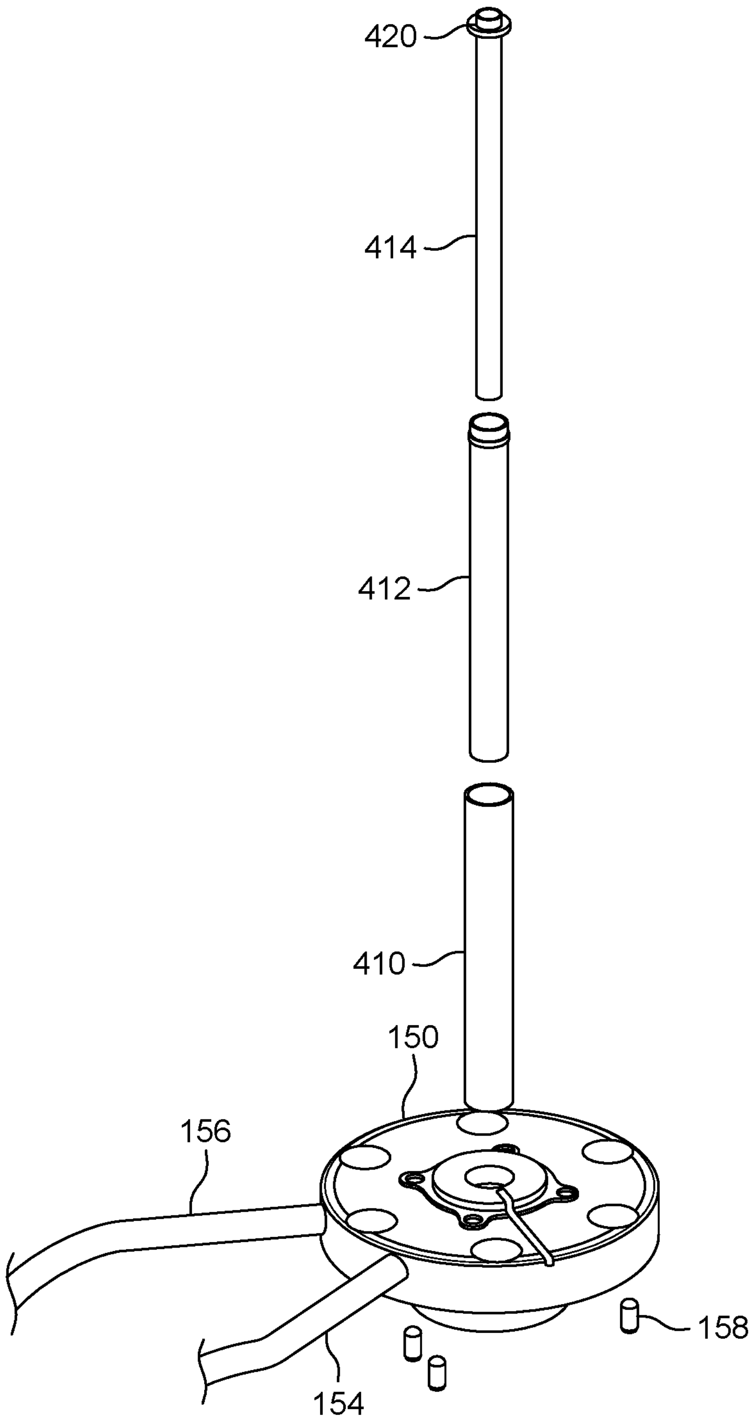
FIG. 3 is a perspective exploded view of the flight tube assembly and its interface to the manifold 150. With the flight tube assembly 400 being shown exploded.

FIG. 3 shows the flight tube assembly exploded.

The flight tube assembly 400 generally comprises a three layer metal tube construction. An inner bore of an inner flight tube 414 is in communication with the vacuum of the vacuum vessel via the flight tube aperture 143. It thus provides an evacuated path to the target of the target assembly 500, located at the distal end of the inner flight tube 414.

A tube-shaped cooling baffle 412 is located between the inner flight tube 414 and an outer flight tube 410 in a concentric fashion. In general, the outer periphery of the proximal end of the cooling baffle 412 is in communication with the coolant return tube 156 by the manifold 150. On the other hand, the inner periphery of the proximal end of the cooling baffle is in communication with the coolant supply tube 154 by the manifold 150.

Each of the outer flight tube 410, tube-shaped cooling baffle 412, inner flight tube 414 are constructed from non-ferromagnetic metal. Currently, they are copper because of its excellent thermal properties and ease with which it can be brazed and soldered.

Figure 4:
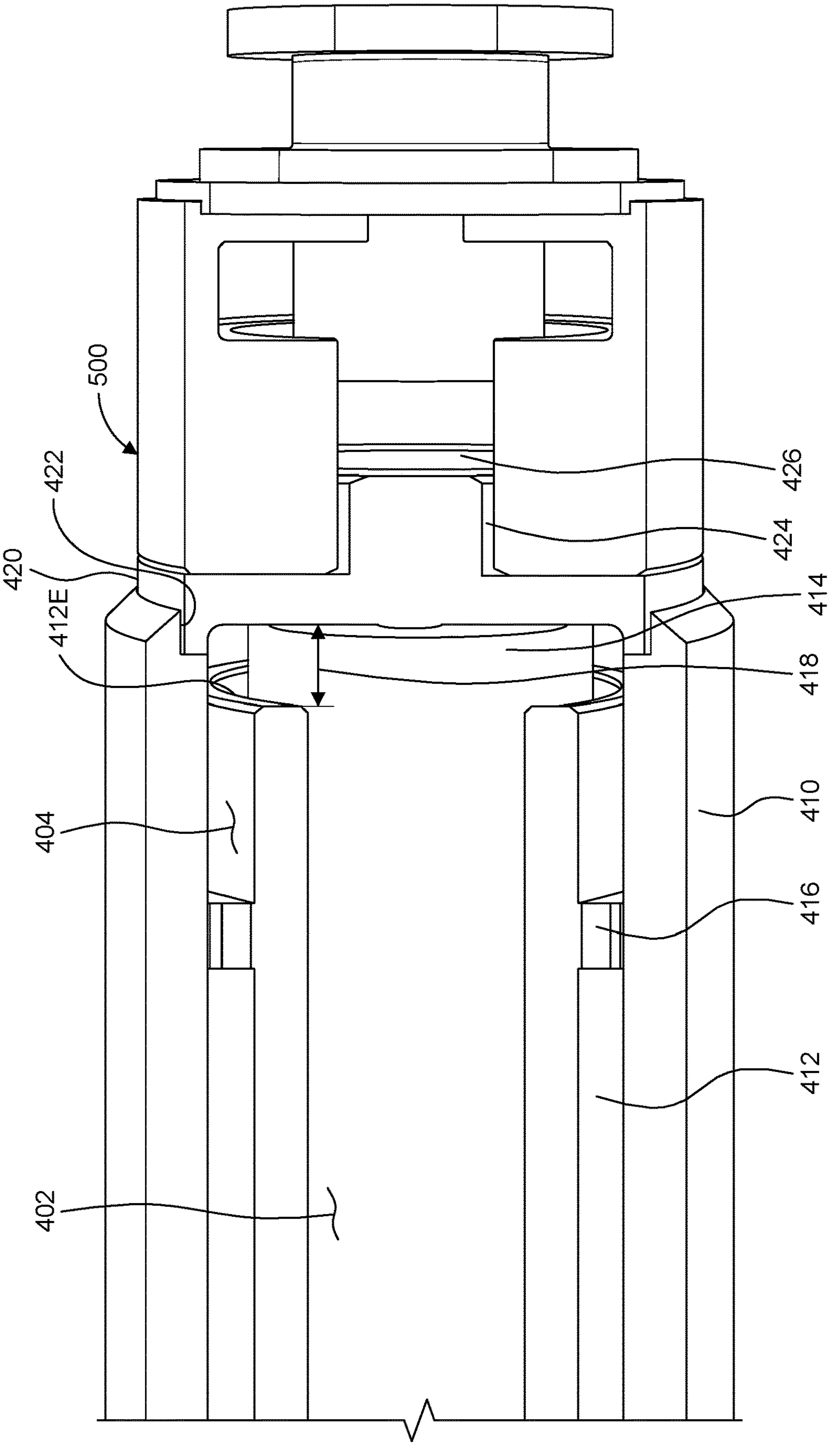
FIG. 4 is a scale elevation cross section showing the distal end of the flight tube assembly 400 and its interface with the target assembly 500.

FIG. 4 is a cross section showing the distal end of the flight tube assembly 400 and its interface with the target assembly 500. It shows how a supply channel 402 is formed between the outer wall of the inner flight tube 414 and the inner wall of the cooling baffle 412 and a return channel 404 is formed between an outer wall of the cooling baffle 412 and an inner wall of the outer flight tube 410. An annular spacer 416 spaces the distal end of the baffle 412 from the inner wall of the outer tube 410. The spacer includes axial holes to allow coolant to flow through the return channel 404.

Nevertheless, in other examples, the flow could be reversed with channel 402 being a return channel and 404 being the supply channel.

In either case, the direct liquid cooling of the flight tube assembly 400 ensures that its temperature remains stable even over long periods of operation. The thermally induced dimensional changes are avoided, preventing changes in the electron beam's focus position.

A flight tube endcap 420 is integral with the inner flight tube 414 or brazed to it. The endcap 420 is also preferably copper and seals against the distal end of the outer flight tube 410 and the inner flight tube 414. In more detail, the distal end of the outer flight tube 410 has an annular shoulder portion 422. The outer periphery of the flight tube end cap 420 fits into this shoulder portion and creates a fluid tight seal against the outer flight tube 410. At the same time, the inner flight tube 414 makes a vacuum seal with the proximal face of the flight tube end cap 420. Moreover, the inner bore of the inner flight tube 414 aligns with an electron beam port 426 that extends through the endcap 420 and its neck 424.

The cooling baffle 412 terminates in the distal direction before the end of the outer flight tube 410 and the inner flight tube 414. This defines a gap 418 between the distal end 412E of the cooling baffle 412 and the proximal face of the flight tube end cap 420 to provide for fluid communication between the supply channel 402 and return channel 404.

This construction also impacts the vacuum quality. Since the vacuum region is defined by the inner bore of the inner flight tube 414 extending to the flight tube endcap 420, and the entire flight tube assembly 400 constructed from metal components, the entire assembly can be baked to burn off impurities that would otherwise outgas and impair the vacuum.

Another feature of this construction is the intimate mechanical connection between the flight tube aperture assembly 142 and the manifold 150. The flight tube aperture assembly 142 is susceptible to heating during operation. Electrons that miss the beam-defining center aperture will heat the flight tube aperture assembly 142 itself. This results in the heating of the aperture assembly 142. Nevertheless, this generated heat in the flight tube aperture assembly 142 is transferred to the manifold 150 where the heat is removed by the coolant that flows through the manifold.

In addition, heat is also generated in a standby mode of operation. According to a first option, the source coils 132N, 132S, 132E, 132W are controlled so that the beam is directed into the body of the flight tube aperture assembly 142 so that the beam misses aperture 143. Thus, the flight tube aperture assembly functions as a beam dump. Another option is to use the beam steering and shaping system 600 to bend the beam into the inner wall of the inner flight tube 414 of the flight tube assembly 400 to thereby function as a beam dump.

This standby mode is useful for interrupting x-ray generation at the target while still keeping the components associated with generating the electron beam operational. When employing either of these two options, the generated heat is efficiently removed by the coolant. When the flight tube aperture assembly is used as the beam dump, the heating of the flight tube aperture assembly 142 is transferred to the manifold 150 and removed by the coolant flowing through the manifold. When the flight tube assembly 400 is used as the beam dump, the heat is removed by the coolant flowing in the flight tube assembly. Thus, the standby mode can be maintained indefinitely due to the active cooling of either of the beam dumps.

Figure 5:
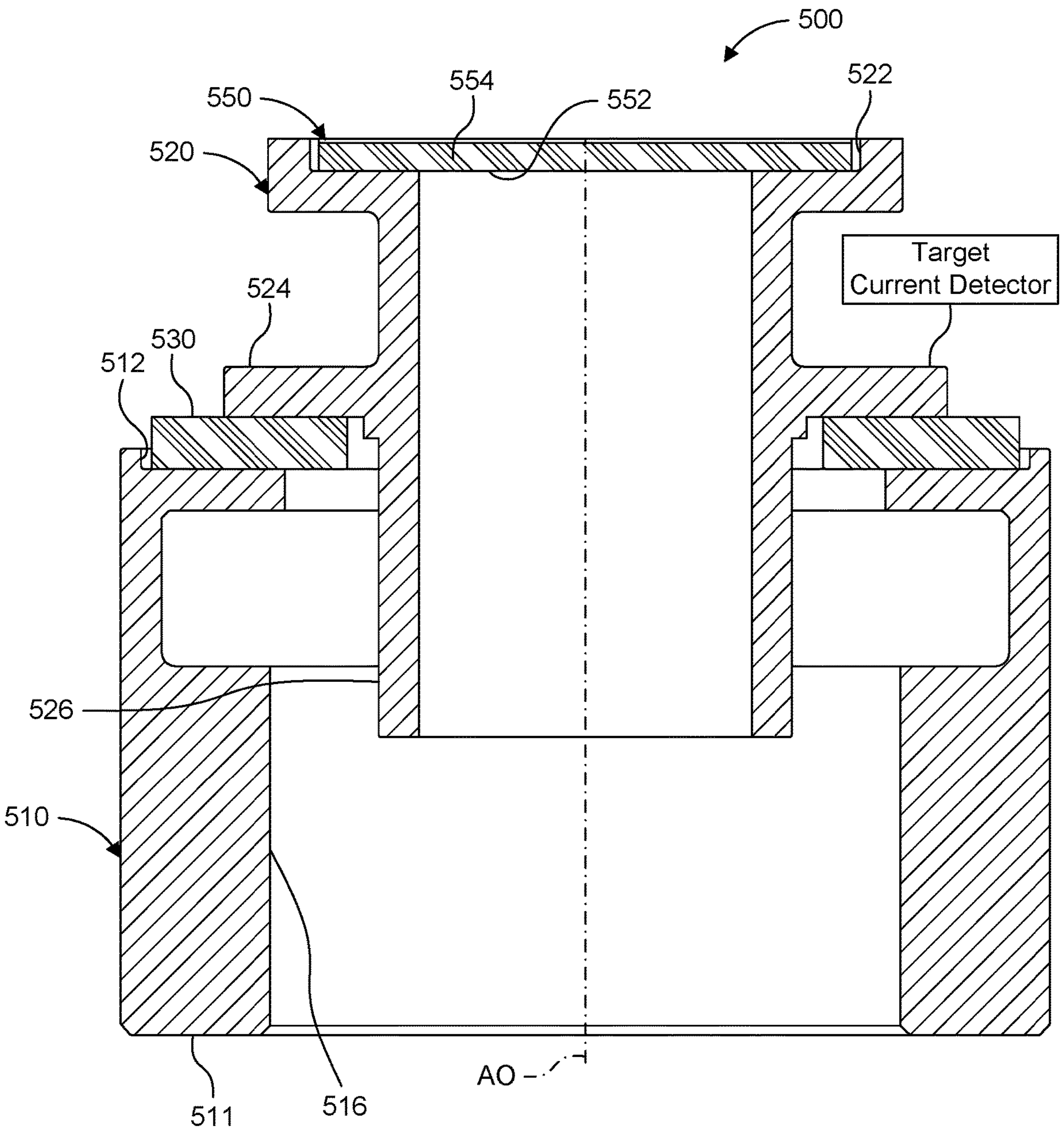
FIG. 5 is a scale elevation cross section of the target assembly 500.

FIG. 5 is a scale elevation cross section of the target assembly 500.

The target assembly 500 includes a flight tube interface ring 510, with a proximal face 511 that seals against the distal side of the flight tube endcap 420. An inner bore 516 of the flight tube interface ring 510 is in vacuum communication with the electron beam port 426 of the end cap 420 (FIG. 3).

A target cartridge tube 520 includes a cartridge tube throat 526 that projects into the inner bore 516 of the flight tube interface ring 510. An annular-shaped cartridge tube saddle 524 projecting outward from the throat 526 forms a seat against the distal end of the flight tube interface ring 510. An electrical isolation ring 530, constructed of a non conductive material such as diamond, is located between the cartridge tube saddle 524 and the distal end of the flight tube interface ring 510 that provides a seat for the isolation ring 530 and electrically isolates the target cartridge tube 520. At the same time, the diamond isolation ring 530 is thermally conductive creating a good thermal connection between the target 552 and the cooling reservoir/heat sink.

The distal end of the target cartridge tube 520 is characterized by a cartridge tube mouth 522. The target 550 is sealed concentrically in that mouth 522.

Generally, the target comprises a substrate layer 554 that provides the bulk of the target and a target metal layer 552 on the distal side of the target that is used to generate the x-rays when bombarded by the electron beam B along optical axis AO. Often the metal layer 552 is, or is an alloy containing, W, Cu, Cr, Fe, or Ag.

Figure 6:
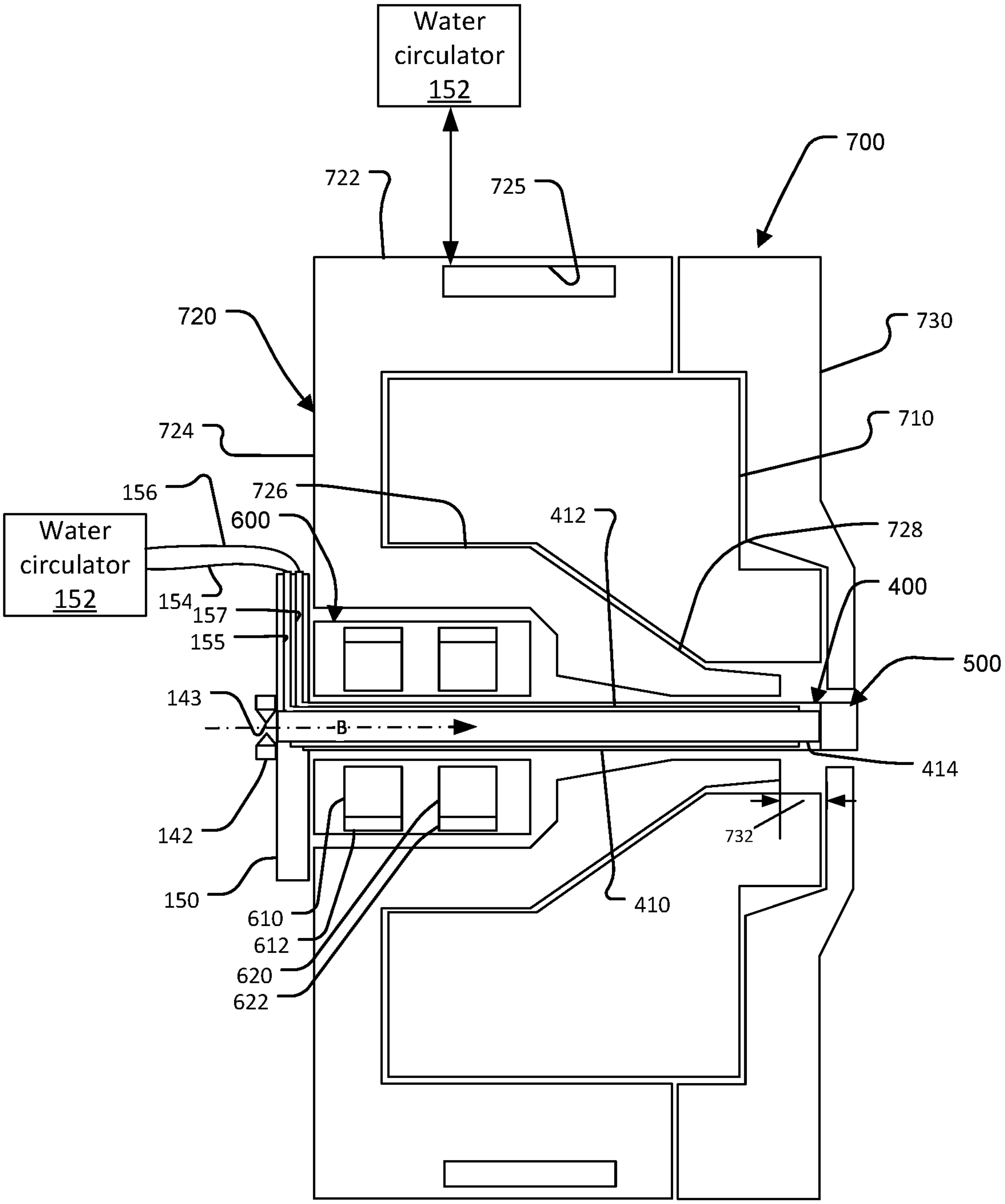
FIG. 6 is a side cross-sectional view showing the beam steering and shaping system 600 and the magnetic focus lens 700 that surrounds the flight tube assembly 400.

FIG. 6 is a side cross-sectional view showing the flight tube assembly 400 and the target assembly and the beam steering and shaping system 600 and the magnetic focus lens 700 that surrounds the flight tube assembly 400.

In terms of the manifold 150, a supply port 155 is also formed through the body of the manifold and couples the supply line 154 to the inner periphery of the proximal end of the cooling baffle 412 so that coolant is supplied to flight tube assembly 400. A return port 157 is formed through the body of the manifold and couples the return line 156 so that coolant is received from the outer periphery of the proximal end of the cooling baffle 412. The beam steering and shaping system 600 surrounds the proximal end of the flight tube assembly 400 but is distal of the manifold 150. In the current embodiment, the beam steering and shaping system 600 comprises a first steering/shaping unit 610 and a second steering/shaping unit 620. The steering/shaping units are annular-shaped structures with the flight tube assembly 400 passing concentrically through each of the units 610, 620.

Preferably each of the units 610, 620 comprises an octupole arrangement, i.e., eight coils equally spaced around the flight tube assembly 400 at 45 degree increments. Currently, the magnetic circuit is facilitated by an outer ferromagnetic ring 612, 622 for each of the units. Additionally, each coil preferably has a ferromagnetic core, although in some embodiments, the coils have air cores.

The first steering/shaping unit 610 and the second steering/shaping unit 620 are controlled by the system controller 200 to optically condition the electron beam B and to control the position of the beam's impact on the target. Specifically, the two units allow the system controller 200 to correct for higher order aberrations (i.e. astigmatism) in the cross sectional profile of the electron beam B.

The magnetic focus lens 700 surrounds the beam steering and shaping system 600. In more detail, a focus coil 710 overlaps at least part of the first steering/shaping unit 610 and all of the second steering/shaping unit 620 in the distal direction.

The focus coil 710 is wound around a focus yoke 720. In general, the focus yoke 720 has a generally "U" shaped profile that is circularly symmetric around the axis defined by the electron beam B.

In more detail, a yoke outer body 722 functions also as a heat sink. An annular yoke cooling duct 725 runs through an outer peripheral portion of the yoke outer body. Coolant, such as water, is circulated through this cooling duct 725 to remove heat.

A yoke bridge 724 is an annular-shaped portion that runs inward from the yoke outer body 722 at the proximal end of the magnetic focus lens 700.

A yoke inner body 726 starts at the inner end of the yoke bridge 724 and projects distally. It starts over the beam steering and shaping system 600 and then converges toward the outer sides of flight tube assembly 400 as it moves distally toward the target assembly 500. In this way, the yoke bridge 724 guides the magnetic field generated by the large focus coil 710 and directs that field to the beam B near the target assembly 500. A pole tip 728 of the focus yoke 720 represents the end of the yoke inner body 726 that ends just proximal of the target assembly 500.

A yoke cap 730 closes the magnetic circuit. The yoke cap 730 is annularly-shaped, wrapping concentrically around the target assembly 500. At its outer edge, the cap mates with the distal end of the yoke outer body 722 and from there projects inward toward the target assembly 500 and the distal end of the pole tip 728. There is an air gap 732 between the distal end of the pole tip 728 and the inner end of the yoke cap 730. The air gap 732 ensures that flux through the yoke and the cap leaks into the path of the electron beam B where it strikes the target in order to focus that beam.

Figure 7:
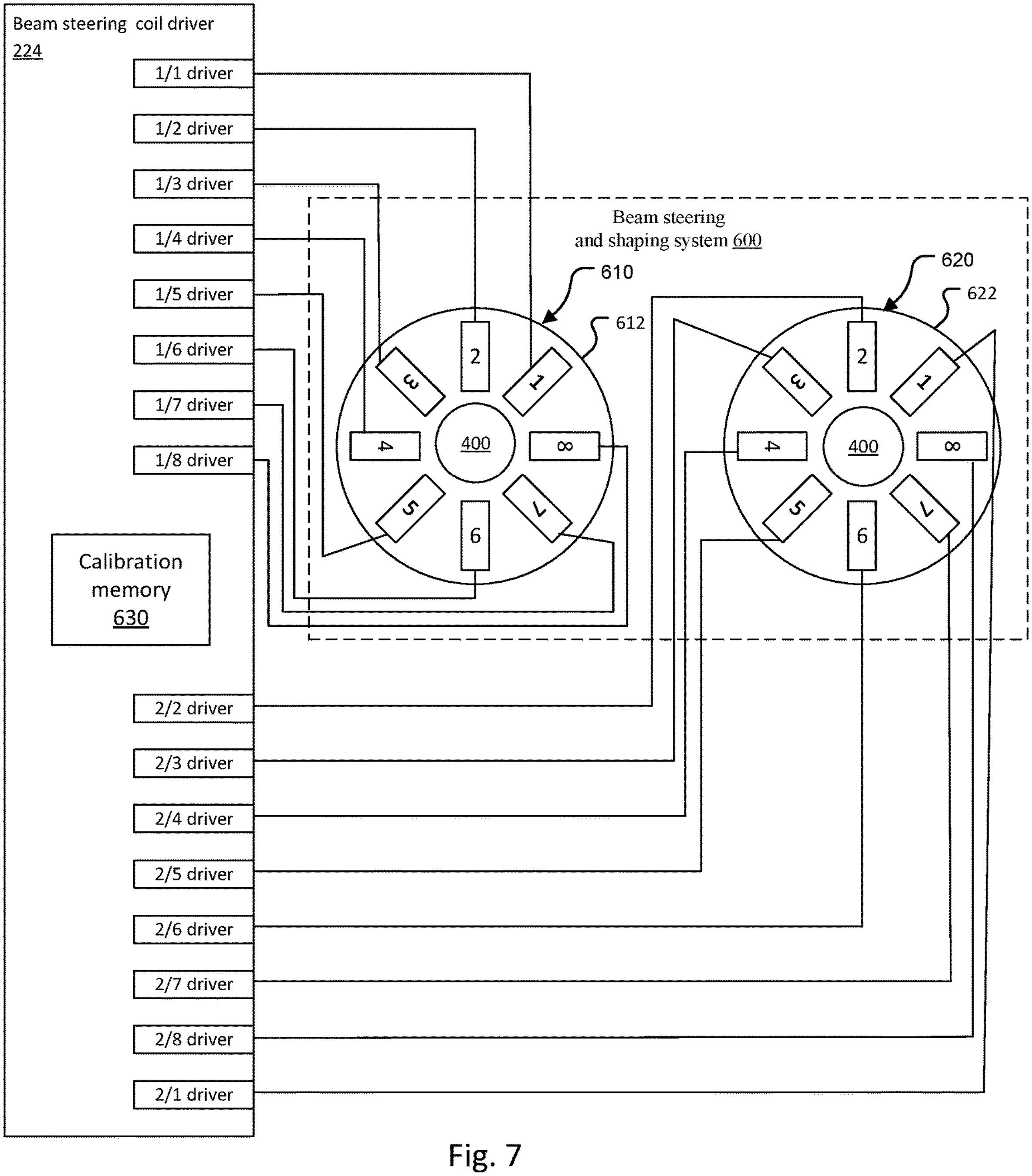
FIG. 7 is a schematic diagram showing the beam steering driver 224 providing individual coil control to the beam steering and shaping system 600.

FIG. 7 is a schematic diagram showing the beam steering driver 224 and the beam steering and shaping system 600.

The control of first steering/shaping unit 610 and the second steering/shaping unit 620 is performed by the digital processor 210 of the system controller 200. It has individual control of each of the eight coils 1-8 of each of the two units 610, 620. In more detail, the beam steering coil driver 224 comprises two banks of eight coil drivers. These coil drivers enable the drive the system controller 200 to individually control the current in each coil of each of the two units. This level of control allows the beam B to be both steered and shaped.

In the current embodiment, a calibration memory 630 is added to the printed circuit board 632 on which the sixteen coils are installed. The memory 630 is read and programmed from the control board. It stores the mapping between the different drivers and the coils and the polarity of those coils.

While this invention has been particularly shown and described with references to preferred embodiments thereof, it will be understood by those skilled in the art that various changes in form and details may be made therein without departing from the scope of the invention encompassed by the appended claims.

What is claimed is:

1. An x-ray source comprising:
- a target assembly including a transmission target at a distal side of the target assembly;
- an electron source for generating electrons to impact the transmission target to generate x-rays from a distal side of the transmission target;
- a high voltage generator for accelerating the electrons; and
- a flight tube assembly separating the target assembly from the electron source and extending a vacuum to a proximal side of the transmission target, the flight tube assembly transporting a coolant to a proximal side of the target assembly.

2. The source as claimed in claim 1, further comprising a flight tube manifold for supplying coolant to the flight tube assembly and receiving returning coolant.

3. The source as claimed in claim 1, wherein the flight tube assembly comprises:
- an inner flight tube for providing a vacuum and for leading the electrons to the transmission target;
- an outer flight tube; and
- a baffle between the inner flight tube and the outer flight tube for directing coolant to a distal end of the flight tube assembly.

4. The source as claimed in claim 3, further comprising a spacer between the outer flight tube and the baffle.

5. The source as claimed in claim 1, wherein the target assembly comprises:
- a flight tube interface ring;
- a target cartridge tube; and
- an electrical isolation ring between the flight tube interface ring and the target cartridge tube.

6. The source as claimed in claim 5, wherein the transmission target is mounted in a mouth of the target cartridge tube.

7. The source as claimed in claim 1, wherein the flight tube assembly extends through a beam steering system and a magnetic focus lens.

8. A method for cooling a transmission target of an x-ray source, the method comprising:
- flowing coolant through a flight tube assembly to a proximal side of a target assembly including the transmission target at a distal side of the target assembly while extending a vacuum to a proximal side of the transmission target; and
- flowing the coolant returning from the target assembly through the flight tube assembly.

9. The method as claimed in claim 8, further comprising separating the coolant flowing to the transmission target from coolant flowing from the transmission target with a baffle.

10. The method as claimed in claim 8, further comprising flowing the coolant through a target steering system and a magnetic lens.

11. The method as claimed in claim 8, further comprising electrically isolating the flight tube assembly from a target assembly holding the transmission target.

12. A target assembly for an x-ray source, the assembly comprising:

a target;

a cartridge tube holding the target;

an interface ring for interfacing to a flight tube; and an isolation ring between the cartridge tube and the interface ring, wherein the isolation ring electrically isolates the cartridge tube and the transmission target from the interface ring and the flight tube.

13. The target assembly of claim 12, wherein the isolation ring is electrically insulating and thermally conductive.

14. The target assembly of claim 12, wherein the isolation ring is fabricated from diamond.

15. The target assembly of claim 12, wherein a flight tube assembly of the flight tube transports the coolant to the side of the interface ring away from the target.

16. An x-ray source comprising:

a target assembly including a target, which is fluid cooled;

an electron source for generating electrons to impact the target;

a high voltage generator for accelerating the electrons; and a flight tube assembly separating the target assembly from the electron source;

a magnetic focus lens; and a beam steering and shaping system nested between the magnetic focus lens and the flight tube assembly, wherein the steering/shaping unit comprises at least eight coils;

a bank of eight coil drivers for separately driving each of the eight coils; and a system controller for separately controlling driving of the eight coils via the bank.

17. The source as claimed in claim 16, wherein the beam steering and shaping system comprises at least one steering/shaping unit between the flight tube assembly and a yoke of the magnetic focus lens.

18. The source as claimed in claim 16, wherein the beam steering and shaping system comprises two steering/shaping units between the flight tube assembly and a yoke of the magnetic focus lens.

19. The source as claimed in claim 16, wherein the beam steering and shaping system corrects for astigmatism.

20. The source as claimed in claim 16, further comprising a calibration memory storing a mapping between the eight coil drivers and the eight coils and a polarity of the eight coils.

21. An x-ray source comprising:

a target assembly including a target;

an electron source for generating an electron beam;

a flight tube assembly separating the target assembly from the electron source;

a magnetic focus lens for focusing the electron beam on the target; and a beam steering and shaping system having at least a first array of eight coils and a second array of eight coils, the first array and the second array being arranged around the flight tube assembly;

a first bank of eight coil drivers for separately driving each of the eight coils of the first array and a second bank of eight coil drivers for separately driving each of the eight coils of the second array; and a system controller for separately controlling driving of the eight coils of the first array and the eight coils of the second array via the first bank and the second bank for steering and shaping the electron beam.

22. The source of claim 21, further comprising at least one outer ferromagnetic ring for the coils.

23. The source of claim 21, wherein the system controller further controls a position of the beam's impact on the target.

24. The source as claimed in claim 21, further comprising a calibration memory storing a mapping between the eight coil drivers of the first bank, the eight coil drivers of the second bank, and the eight coils of the first array and the eight coils of the second array and a polarity of the coils.

* * * * *